SATURISTORS COMPRISING HARD MAGNETIC MATERIALS ENERGIZED BY ALTERNATING CURRENTS

Filed Sept. 30, 1963 5 Sheets-Sheet 1

INVENTOR.
PHILIP L. ALGER
BY James K Campbell
HIS ATTORNEY

INVENTOR.
PHILIP L. ALGER
BY James R. Campbell
HIS ATTORNEY

INVENTOR.
PHILIP L. ALGER
BY James R. Campbell
HIS ATTORNEY

INVENTOR.
PHILIP L. ALGER
BY James R Campbell
HIS ATTORNEY

INVENTOR.
PHILIP L. ALGER
BY James R. Campbell
HIS ATTORNEY 3,293,468
Patented Dec. 20, 1966

3,293,468

SATURISTORS COMPRISING HARD MAGNETIC MATERIALS ENERGIZED BY ALTERNATING CURRENTS

Philip L. Alger, Schenectady, N.Y., assignor to General Electric Company, a corporation of New York Filed Sept. 30, 1963, Ser. No. 312,591
22 Claims. (Cl. 310—166)

The invention described herein relates to dynamoelectric machines and particularly to the use of hard magnetic materials in the secondary windings of motors for obtaining variable speed operation.

Conventionally, direct current motors are used with equipment requiring operation over a wide range of speeds. Although perfectly acceptable motor performance is obtained, separate direct current power supplies or circuitry capable of furnishing D.C. power from an A.C. source to the motor is necessary because normal power sources are of a three-phase alternating current type. The D.C. motor and control equipment first costs therefore are relatively high when compared with a corresponding A.C. machine, and because commutators and brushes are used, maintenance costs are incurred in assuring reliable and uninterrupted operation.

Recognizing these disadvantages, manufacturers for years have used induction and other types of alternating current motors where possible, in conjunction with different speed control methods, to provide adjustable speed operation for the driven equipment. Such speed control methods are of many diverse kinds but they each have separate disadvantages peculiar to the particular speed control scheme used. Speed control methods utilizing equipment for controlling line voltage to the induction motor are appropriate for use in some installations, but at low speeds the current required for a given torque becomes excessive, and the rotor heating is too great for continuous operation. The reason for this is the effective rotor resistance is $R_{2/S}$, where S is the motor slip (actual motor speed=1—$S$ synchronous speed), so that if $R_2$ does not change, a given torque, measured by $I^2R_{2/S}$, requires that current I increase in proportion to $\sqrt{S}$.

Likewise varying the line frequency is acceptable in some cases but separate power supplies are required for obtaining the necessary changes in frequency thus raising the first costs for the motor and control system to relatively high values.

Other methods, such as changing the number of poles or inserting resistance in the secondary winding of wound rotor motors are satisfactory for some purposes, but contactors which are used in these cases to vary the speed, create abrupt changes in torque which may not be acceptable. This is especially undesirable in motor applications requiring uniform accelerating rates, such as conveyor belt drives for example, where the abrupt jolts resulting from contactor operation may spill the contents from the belt, in addition to subjecting the belt system to undue mechanical forces. Voltage or impedance control, using saturable reactors, preferably in the motor secondary circuit, with or without feedback control, has gained recent acceptance but this likewise involves high costs. Also, the performance does not reach desired levels because the reactors have very low resistance and therefore do not contribute to the motor torque, except indirectly when they are placed in parallel with secondary resistors.

A major limitation in the design of induction motors therefore is the high starting currents resulting from the low reactance and low secondary resistance required to attain high breakdown torque and high full load speed operation. It is well known that an induction motor having a low secondary resistance, that is, a rotor winding displaying low resistance characteristics, has a locked rotor current of about 5 to 6 times full load current, depending on the full-load power factor, if its breakdown torque has the normal value of somewhat more than twice full load. In wound rotor motors, external resistors have been used in series with the rotor winding with contactors connected at appropriate points in the circuit to reduce the resistance in successive steps, and therefore control the level of starting current, as the motor accelerates to full speed. In squirrel cage motors, many forms of double squirrel cage or deep-bar designs have been used which introduce an extra impedance that is essentially a resistance at start, but becomes a reactance at full speed.

Consideration of these limitations governing the design of induction motors shows a basic need for some kind of impedance element adapted for use in the rotor circuit which will have a low reactance at full speed, and whose resistance will be high during starting, when the rotor frequency is high, but will have a relatively low value of effective resistance at full speed when the rotor frequency approaches zero. Such an impedance element advantageously also functions as described without the need for electrical switches or mechanical motion. Moreover, such an element should be capable of association with the motor in a small space and at low cost.

A solution to this long standing problem which satisfies the above-identified needs, has now been found which consists in introducing a hard magnetic material, such as Alnico, into the leakage flux paths of the rotor of an induction motor.

The design of squirrel cage rotors permits locating the hard magnetic material directly in the squirrel cage slots, while for wound rotor motors, it preferably is incorporated in a reactor apart from but connected to the secondary winding. When a material such as Alnico is subjected to an alternating M.M.F., large hysteresis losses are created in the material that are proportional to the frequency. They are high when the frequency is high, during the rotor accelerating period, and are low when the motor reaches full speed, with its low slip frequency. These losses are the equivalent of the $I^2R$ losses in conventional induction motors and so add to the motor torque. Such materials heretofore have been used for permanent magnets, but as far as known, no consideration has been given to their use in A.C. circuits because hysteresis losses and consequent heating constitute serious disadvantages for usual purposes. They have not been used in either the primary or secondary circuits of motors.

A hysteresis motor may be classified as an exception to this general statement but it is well known that such motors utilize a solid rotor of hard magnetic material as distinguished from the use of such material as separate bars in the rotor slots. The entire air gap flux flows through the solid material of the rotor producing hysteresis losses, which provide torque and make the motor run at synchronous speed. However, this type of motor is limited to very small sizes, because the hard material acting alone cannot provide sufficient torque for practical use in motors larger than fractional horsepower sizes. Also the high magnetizing currents needed, the high rotor surface losses, and the mechanical difficulties of manufacturing a rotor with this brittle material, all make the motor relatively expensive per unit of output. Such hysteresis motors are limited in application to very small devices such as phonographs because of the high exciting current required to force the entire rotor flux through the hard magnetic material and the small torque obtainable from hysteresis losses alone.

In carrying out my invention in a practical form, I locate the hard magnetic material in the slots above the conductors forming the secondary winding in a squirrel cage induction motor. Thus, the Alnico is positioned in the leakage flux paths of the secondary circuits and when magnetized by the slot conductor currents induced by the main flux, produces a high locked rotor torque per ampere without sacrifice of the full load speed. When these slot conductors are linked by the high frequency magnetic field attributable to the high frequency current established by the rotating field in the primary winding of the stator, both the effective resistance and reactance caused by the presence of the hard magnetic material are relatively high thereby inherently limiting the starting current to 3 or 4 times the value appearing in the winding under full load conditions instead of the usual 6 times. As the rotor accelerates and approaches the full load speed, where the slip frequency is normally less than about 4%, the resistive component due to the hard magnetic material decreases nearly to zero.

To utilize these desirable characteristics of the hard magnetic materials in wound rotor induction motors, a reactor having hard magnetic material in its flux path is located remote from the winding, preferably on the shaft, but is connected in series therewith for producing low starting currents and effecting reduction in heating with substantial improvement in the torque per ampere developed during the accelerating period. It will be apparent to those skilled in the art that such magnetic materials are useful also with other types of motors, such as reluctance and capacitor motors, and split phase fractional horsepower motors.

While the specification concludes with claims particularly pointing out and distinctly claiming the subject matter which I regard as my invention, it is believed the invention will be better understood from the following description taken in connection with the accompanying drawings in which:

Figure 6:
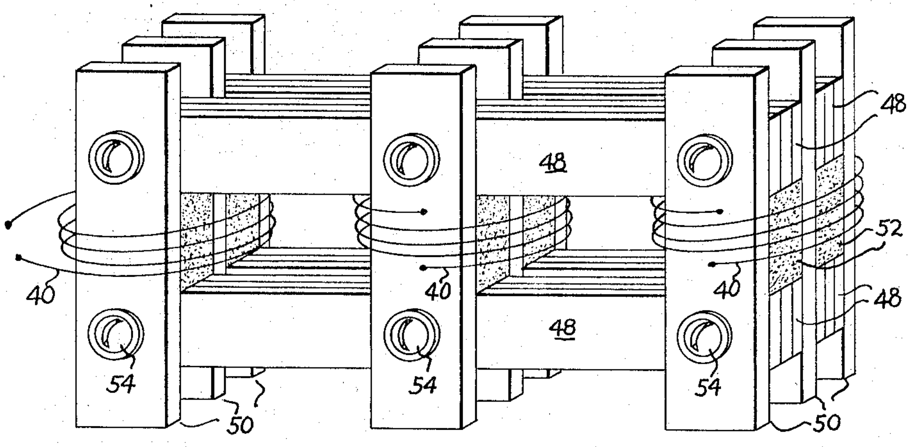
Figure 7:
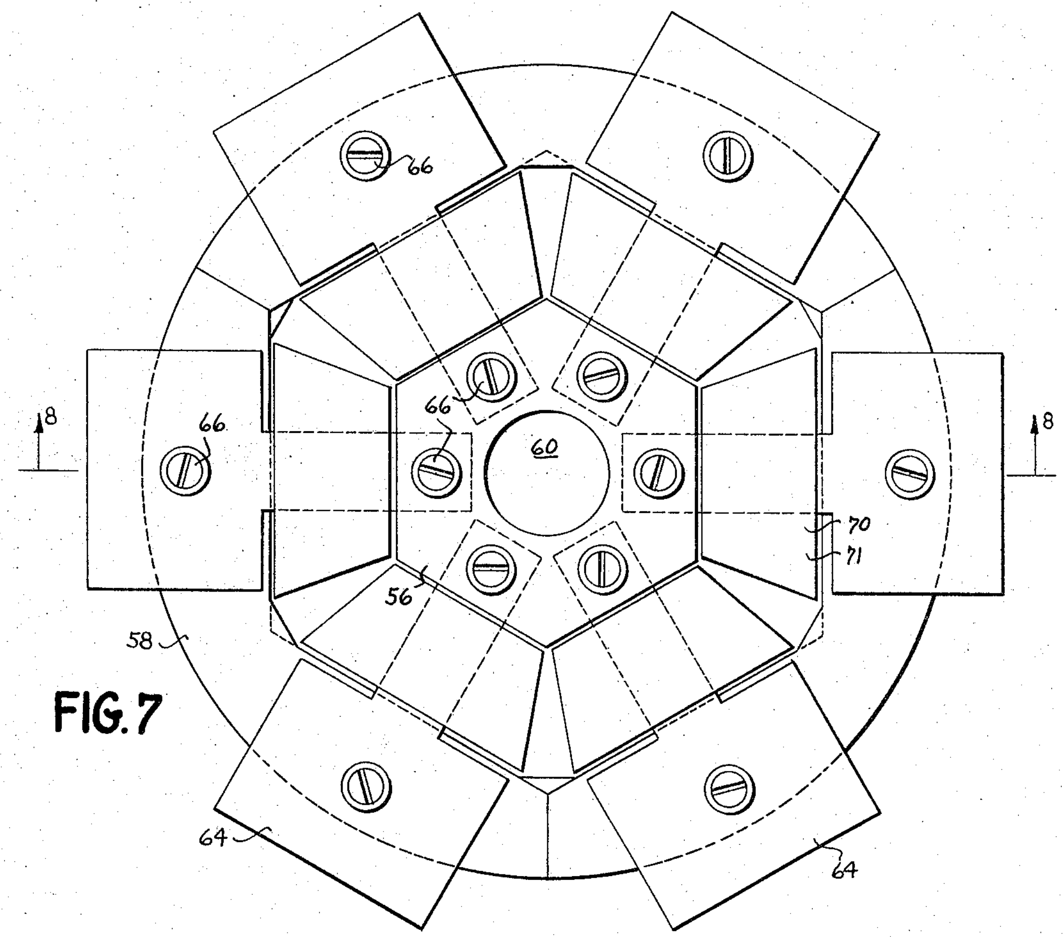
Figures 8, 9:
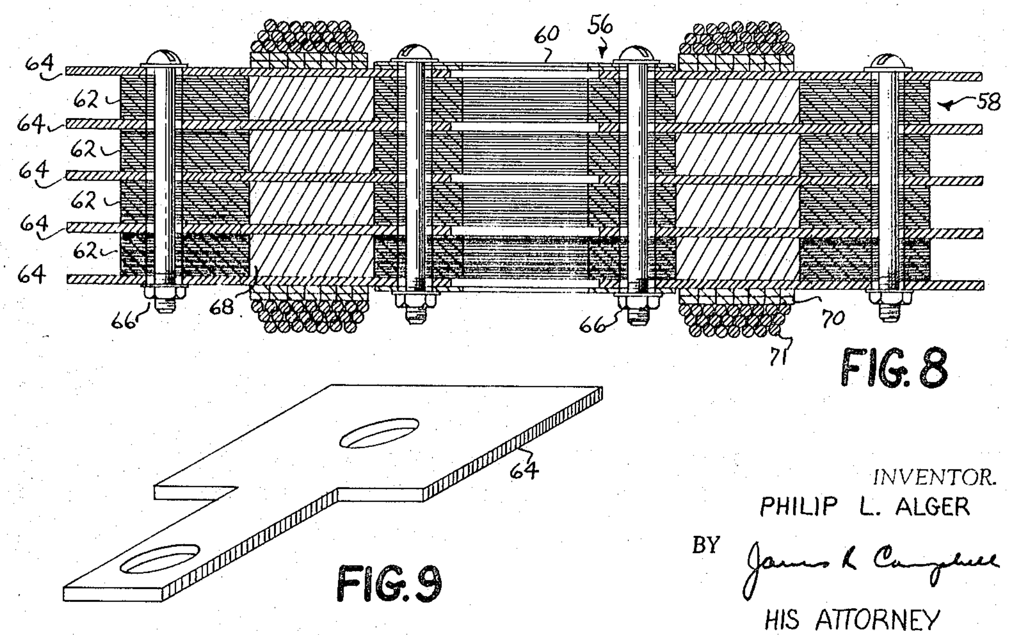
Figure 10:
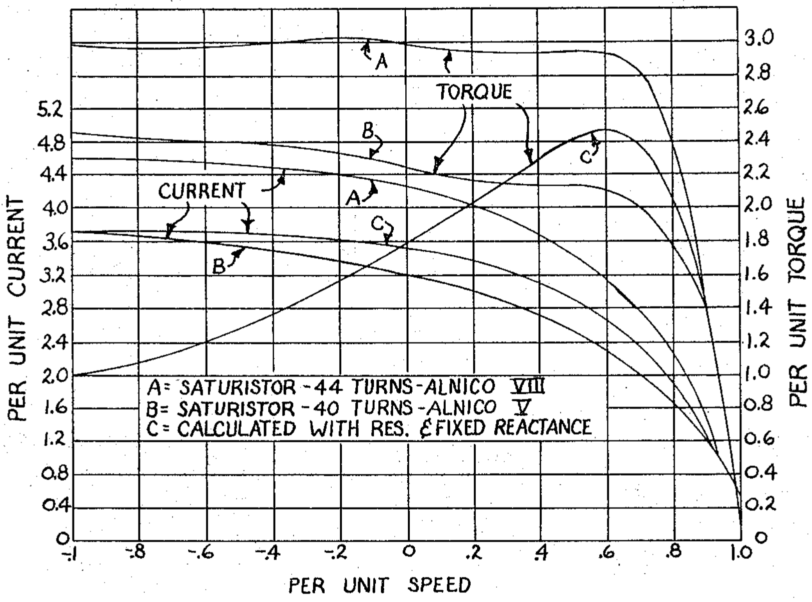

FIGURES *5a, 5b* and *5c* show perspective views of different types of Saturistor reactors;

FIGURE 6 illustrates a rectangular reactor having metallic heat radiating plates disposed therein;

FIGURE 7 is a plan view of a circular Saturistor reactor;

FIGURE 8 is a view taken on lines 8—8 of FIGURE 7;

FIGURE 9 is a detail view of a copper plate used in the reactor of FIGURES 7 and 8;

FIGURE 10 shows speed-torque-current curves obtained from testing a wound rotor induction motor with two different types of Saturistor reactors in the secondary circuit.

Figures 11A, 11B, 12:
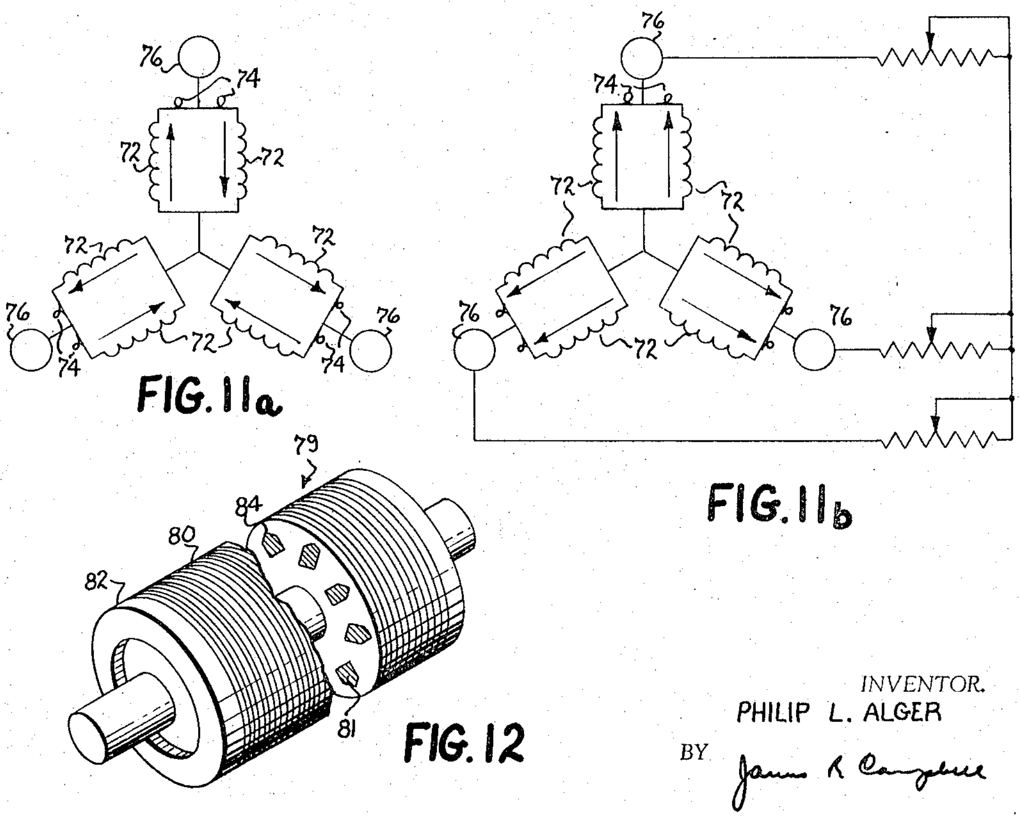

FIGURES 11*a* and 11*b* illustrate a single basic rotor winding circuit connected for use with high speed and low speed stator connections, respectively.

Figure 17A:
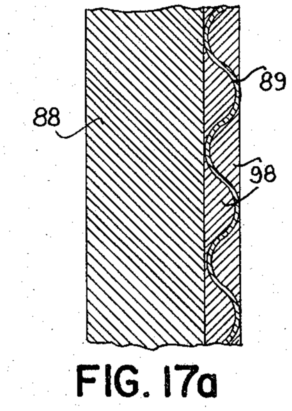
Figure 17B:
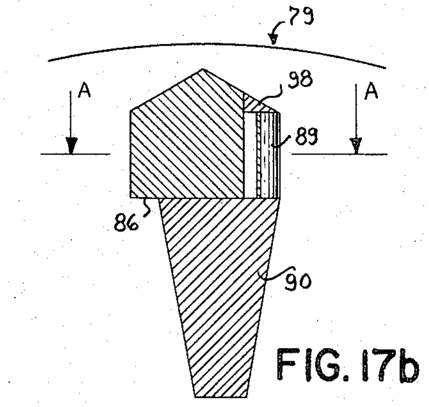
Figure 18:
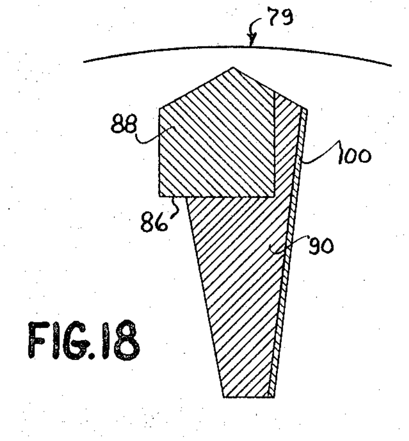
Figure 19:
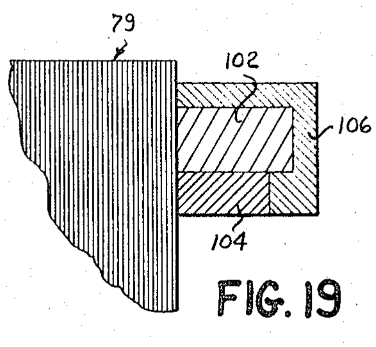

FIGURE 12 is a perspective view of a squirrel cage rotor;

FIGURES 13 through 18 show different arrangements for securing Alnico in squirrel cage slots; and FIGURE 19 is a partial view of an end of a rotor illustrating the disposition of a hard magnetic material adjacent the rotor end rings.

Figure 1:
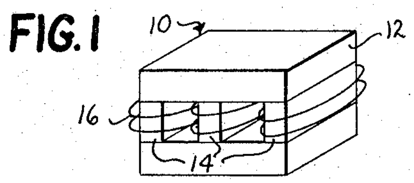
FIGURE 1 is a perspective view of a Saturistor reactor having hard magnetic material in the reactor legs.

Referring now to the drawings wherein like reference characters designate like or corresponding parts throughout the several views, there is shown in FIGURE 1 an alternating current reactor having a hard magnetic material in the magnetic flux paths, adapted for incorporation in the secondary circuits of an induction motor to produce high locked rotor torque per ampere without sacrifice of full load speed. The reactor comprises a laminated magnetic core 10 made of a multiplicity of stacked laminations 12. The laminated core shown includes legs 14 of hard magnetic material such as that commercially available under the trademarks Alnico or Lodex, although others may be used. For further details concerning the suitable retentive magnetic materials, reference may be had to my cosponsored AIEE Transactions Paper No. 62–1389, published October 26, 1962, entitled "Saturistors and Low Starting Current Induction Motors" and to appropriate engineering handbooks, for example, "Handbook of Engineering Fundamentals" by Eshbach, Wiley Handbook Series, 2nd edition, printed August 1952, particularly commencing at chapter 12, page 109 therein. Ferrites may be used, but the high thermal resistivity imposes severe limitation on their use in reactors. A magnetizing alternating current coil 16 is wrapped around each of the legs. The reactor impedance has a large resistive component attributable to hysteresis losses that is proportional to frequency. The magnitude of reactance also varies in the same direction as changes in frequency, so that the power factor is nearly constant as the frequency varies.

The modern permanent magnet materials now have magnetic energies of five million gauss-oersteds and more, so that when fully energized, the hysteresis loss at 60 cycles is as much as 300 watts/cu. in. This loss is proportional to frequency. A particular and distinguishing characteristic of inductive electric circuits, or reactors, having these hard magnetic materials in their flux paths not generally recognized, is that the resistance component of the circuit impedance changes markedly as the current through it increases. At low values of magnetizing force, the impedance is low, corresponding to a permeability of perhaps three times that of air in the flux path, but as the flux-producing current rises, the permeability and both the reactive and resistive components increase drastically. The point at which such changes in the impedance occur is known as the pickup value of the current. This feature is particularly useful in utilizing such an Alnico core reactor as a current limiter, as the impedance may be large enough to limit the starting current, but small enough at normal currents to have little effect in continuous operation.

Both the resistive and reactive components are reduced when a direct current M.M.F. also is applied by a coil wrapped around one leg of the core. To avoid A.C. voltage in the D.C. circuit, it is desirable to place the D.C. coil on the middle leg only of a three leg core for single phase operation, or to use a circular construction for three phase operation as illustrated in FIGURE 7. The presence of D.C. will cause the hard magnetic material to saturate at a lower flux density, thereby reducing its effective impedance on the A.C. side. In this way, it is possible to control the amount of effective resistance and reactance of the A.C. circuit, because of the presence of Alnico, by means of a small D.C. control current which can be supplied from any source, such as a feedback circuit. A reactor with Alnico in its magnetic flux paths and with an additional D.C. winding therefore becomes to a large degree a resistor, instead of merely a reactor; and its resistance can be controlled by saturation. In view of its applicability, I have chosen to identify this new circuit element by the name "Saturistor" which is an abbreviation for a saturable resistor. This term is used herein to identify both reactors and motors.

The typical B–H curves for the hard magnetic material Alnico V obtained by the application of direct current to the material show that (a) when the peak M.M.F. is below about 400 oersteds, the flux density is low and is proportional to the M.M.F., thus corresponding to a permeability of about 3.4 times that of air and (b) when an A.C. M.M.F. of a peak value greater than 600 oersteds is applied, the flux density does not rise above zero until the M.M.F. reaches about 550 oersteds in each cycle. That is, when the peak of a sine-wave M.M.F. is 1000 oersteds, for example, the zero point of the flux wave lags behind that of the current by a phase angle $\phi=\sin^{-1} 0.55=33°$, approximately, giving an apparent power factor of 0.55, and (c) the maximum stored energy is about $5\times10^6$ gauss-oersteds. This gives an apparent hysteresis loss of 0.31 f. watts/cu. cm., or about 300 watts/cu. in. at 60 cycles.

Figure 2:
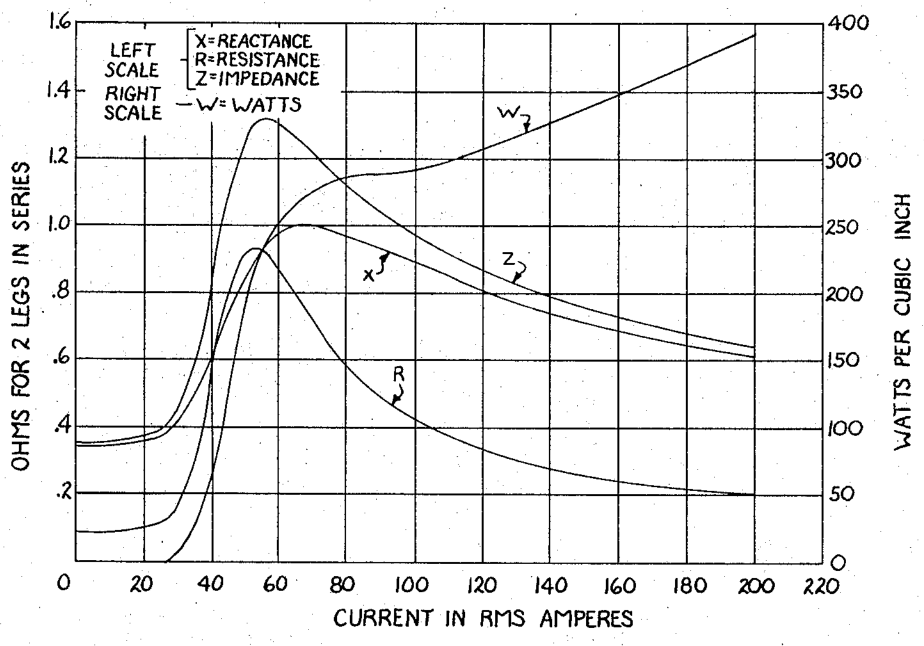
FIGURE 2 illustrates 60 cycle impedance curves for a reactor of the type shown in FIGURE 1 utilizing Alnico V as the hard magnetic material.

Curves measuring the 60 cycle values of R, X, and Z for a Saturistor reactor of FIGURE 1 using A.C. coils only, are illustrated in FIGURE 2. The reactor includes in addition to the laminated magnetic core, 10 blocks of Alnico V in each of the legs, and 40 turns in each A.C. magnetizing coil 16. Each individual block was 1.5" x 1" x ⅜", so that the length of the flux path was 1.5" per leg. The area equalled 3 sq. in. and the total volume of Alnico was 11.25 cu. in. Referring to FIGURE 2, it will be seen for currents below 30 R.M.S. amperes, the resistance was the same as the D.C. resistance of the two coils in series or 0.09 ohm. Then, from 30 to 50 amperes, the resistance "picked up" and rose to a maximum value of 0.93 ohm at 53 amperes; while at higher current values the resistance fell rapidly. The peak M.M.F corresponding to 30 R.M.S. amperes is:

$$\frac{4\pi(30)(40)\sqrt{2}}{10(2.54)(1.5)}=560 \text{ oersteds}$$

which agrees well with the B–H curves for Alnico V discussed in the preceding paragraph.

The product $I^2$ (R−0.09) gives the total watts dissipated in the hysteresis loss of the Alnico, and this divided by 11.25 gives the watts/cu. in., which are plotted also in FIG. 2. They rise from zero at 25 amperes to 275 at 70 amperes, and continue to rise gradually at higher currents.

The initial reactance X was about 0.34 ohm, corresponding to a permeability of about 3.5 times that of air, although allowance for leakage flux would reduce this, which again accords reasonably well with the B–H curves for Alnico V discussed above. As shown, the reactance rose suddenly, beginning at about 30 amperes, to a maximum of 1.00 ohm at 66 amperes, and at higher currents it fell gradually. The impedance reached a maximum of 1.32 ohms at 56 R.M.S. amperes, and fell steadily at higher currents.

Thus, a Saturistor reactor of this type has three useful properties:

(1) Its impedance rises when the current rises, over a limited range of current, just opposite to the behavior of a closed iron core reactor, or of Thyrite, whose impedances fall continuously as the current increases.

(2) Its impedance is constant and low initially up to the "pick-up" value of current, and rises rapidly to over four times this value at a current about twice the pick-up value.

(3) Its power factor rises to a maximum of 0.75 (in this case), and is independent of frequency, except for eddy current losses and the coil resistance.

Figure 3:
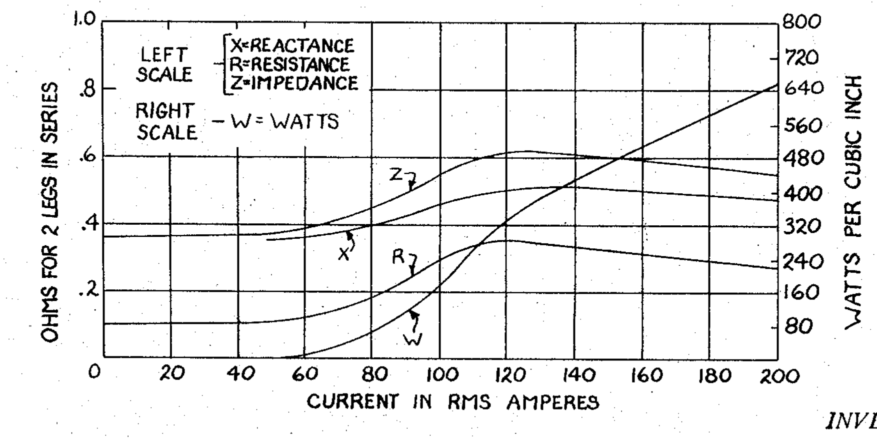
FIGURE 3 illustrates 60 cycle impedance curves for a reactor of the FIGURE 1 design, but employing an Alnico VIII material in the reactor legs.

It will be apparent to those skilled in the art that the use of different hard magnetic materials will change these values materially. Illustrative of this are the curves of FIGURE 3 showing Z, R, X and W curves for a similar Saturistor reactor utilizing Alnico VIII in the reactor legs. As in FIGURE 1 an A.C. coil was wound around the hard magnetic material. The reactor consisted of .044" thick laminations having 10 Alnico V blocks of 1½" x 1" x ⅜" forming the core legs. A 40 turn coil was wound on each leg. It will be noted the initial permeability is nearly the same as for Alnico V but the "pick-up" current is about twice as great and the watts/cu. in. are also considerably larger at high currents. This invention therefore envisions the use of any hard magnetic material which will provide the desired values of impedance, reactance, resistance and power loss desired for any particular application.

It is important to note that in all forms of Saturistor reactors, the hard magnetic material is formed of solid blocks interposed in a laminated magnetic circuit. This is done to make the magnetic flux paths follow the preferred direction of magnetization in the hard magnetic material. The high magnetic energy materials are anistropic and have very poor magnetic qualities in directions at right angles to the preferred direction. By using laminated, high permeability, materials to carry the magnetic flux around corners and through areas remote from the magnetizing windings, the leakage flux and the required magnetizing current are minimized giving superior performance.

In view of these teachings, it becomes apparent the Saturistor is particularly useful for limiting or regulating the flow of current in a circuit. When a Saturistor is placed in a series electric circuit, any change in the current in the region of magnetic pick-up will cause a large change in the Saturistor impedance and in a direction to oppose the change in current. It therefore is useful as a current limiter and capable of application to any circuit or device wherein it is desired to regulate and control the flow of current.

With the above background, consideration now will be given to the application of the Saturistor reactor in the secondary circuits of induction motors. Ideally, and as suggested previously, the secondary resistance of an induction motor should be high at locked rotor, giving a high torque per ampere of starting current, and should be low at full speed giving a low value of full load slip. The Saturistor performs these exact functions because its resistance varies in direct proportion to the frequency. When an induction motor is started, the frequency of the voltage induced in the secondary is high and a secondary circuit which includes the hard magnetic material then has a desirably high resistance at start. As the motor comes up to its synchronous speed, the resistive component of the impedance practically disappears both because the slip frequency will be very low, usually less than about 4% of line frequency, and because the current falls below the pick-up value for the Alnico.

Figure 4:
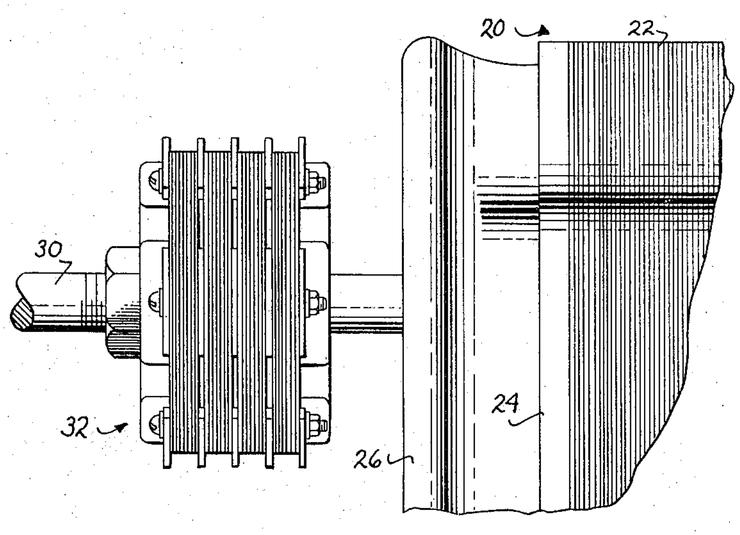
FIGURE 4 is a view in elevation showing an induction motor with a Saturistor mounted on the rotor shaft.
Figures 5A, 5B, 5C:
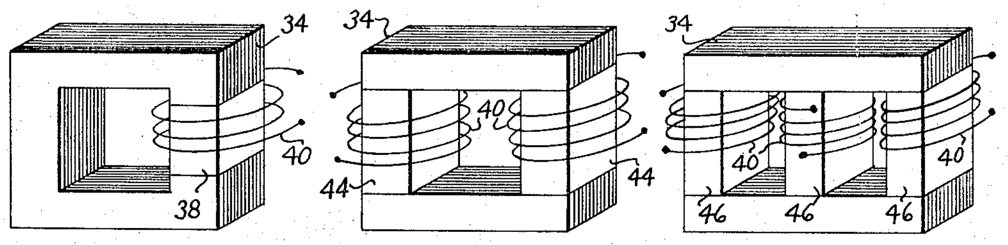

Considering a wound rotor induction motor first, FIGURE 4 illustrates an arrangement wherein a Saturistor reactor is mounted on the shaft of the motor. The rotor for the motor 20 is of a conventional type and comprises a multitude of stacked laminations 22 held under compression by end flanges 24 and having slots for receiving the winding for the machine. These conductors terminate in a conventional end connecting structure, indicated generally at 26. The shaft 30 for the rotor may be made of a longer length than usual to accommodate the mounting of a Saturistor reactor 32.

Although mounting the reactor on the rotor shaft is a desirable way of utilizing it in connection with the motor, it will be apparent that other arrangements may be more suitable in some installations.

Considering these first, the simplest forms of Saturistor reactors useful with wound rotor induction motors and those having the lowest cost, are illustrated in FIGURES *5a*, *5b* and *5c*. The reactor illustrated in FIGURE *5a* merely consists of a multitude of silicon steel laminations 34 held together by bolts (not shown) or other securing means. A block of hard magnetic material 38 is positioned in one of the legs and a magnetizing coil 40 adapted for energization by alternating current is wrapped on the body of the Alnico.

The reactor shown in FIGURE *5b* merely consists of a pair of parallel spaced rectangular blocks of steel laminations 34 but having a pair of legs 44 of hard magnetic material. A.C. coils 40 are wrapped on each of the Alnico blocks.

The modification of reactor illustrated in FIGURE *5c* is the same as the reactor shown in FIGURE *5b* except that the core is comprised of three legs 46 of hard magnetic material, each of which has an A.C. coil wrapped around the Alnico. With three legs in a straight line, there is no return path for the D.C. produced flux, so this construction is only suitable for an A.C. impedance, without D.C. control. The particular cost advantage derived from using any one of these rectangular types of reactors is that the laminations may be sheared out without requiring the use of dies normally required in the lamination punching operation. Also, the reactor may be located remote from the motor 20, where it is conveniently available and since it will not be subjected to centrifugal forces, it may assume any one of the relatively simple designs shown.

Since there is a large power loss in the Alnico when the frequency is high, substantial amounts of heat are generated unless adequate provision is made for cooling, or the time during which the high current at high frequency is applied is short. As is known, when Alnico V is excited at the magnetic saturation density, at 60 cycles, the temperature rises about 6° per second, if the heat is not dissipated.

To meet this situation, strips of copper or aluminum may be disposed within the reactor core as illustrated in FIGURE 6. In this design, the magnetic core is made of a multitude of sectors 48 of stacked laminations having strips or plates 50 of copper, aluminum or other high heat conducting material positioned between the juxtaposed sectors of laminations. As in the previous modification, the core legs consist of Alnico blocks 52 which complete the magnetic circuit and the whole core is held together by bolts 54 in a well known manner. A.C. windings 40 may be applied to the surface of the Alnico blocks in the same manner previously described. Although a preferred form of magnetic core having high heat dissipating capabilities is shown, it will be apparent that many modifications may be made thereto, as by forming the laminations such that the iron of the laminations form part of the core legs in addition to that furnished by the Alnico. Preferably, the Alnico blocks are made about ⅜" thick in order to strike a balance between blocks which are too thin, expensive to manufacture and subject to breakage and warping, and blocks that are too thick and which would have excessive eddy currents at the highest frequencies used.

As shown in FIGURE 6, the copper strips preferably extend beyond the laminated core to provide an easy path for the transfer of heat from the mass of Alnico into the copper plates and steel laminations and to the outside air or cooling medium. By using this kind of design, the average rate of temperature rise is reduced from 6° per second to about 2° per second. Greater reductions can be made by suitable choice for the cooling medium.

In most applications of Saturistor reactors to wound rotor motor circuits, the current in the Saturistor is at a very low frequency, the slip frequency, because the motor operates much of the time under nearly synchronous conditions. At this time, the loss in the Alnico is negligible. Therefore only minimum ventilation is required and reliance may be placed on convection alone since the temperature of the Alnico can rise to about 300° C. without being adversely affected. Obviously, the coils may be heat insulated from the Alnico and additional masses of metal may be placed in thermal contact with the ends of the copper plates to increase the effective heat capacity, or more elaborate cooling arrangements may be employed. Should substantial heat generating conditions exist, the AC coils may be wound on the ends of the magnetic core and thereby be spaced from the core legs. The Alnico in the legs then can be permitted to rise to higher temperature levels without having an undue influence on the coil insulation. One disadvantage in doing so however is that this type of construction will increase the leakage reactance of the coils and thereby lower the power factor of the Saturistor, which may be undesirable in some applications.

It is often advisable to mount the Saturistor reactor on the motor shaft to eliminate the slip rings and brushes which otherwise are required when the Saturistor is located remote from the motor. Because the shaft mounted Saturistor increases the inertia of the rotor, which increases the accelerating torque required for hoist and similar types of duties, and because it sometimes is expedient to connect resistors in parallel with the Saturistor, circular designs may not be appropriate for all applications. Nevertheless, the Saturistor should be of light weight and construction found satisfactory for use with a motor is illustrated in FIGURES 7, 8 and 9.

Referring to these figures, the reactor core is of annular shape and includes separate sets of concentrically disposed stacks of laminations 56 and 58. The inner-set 56 has an outer surface of hexagonal configuration and includes a central bore 60 to permit mounting the reactor on the rotor shaft. Each set of laminations is divided into sectors 62 which are spaced from each other by copper plates 64 of T-shape configuration. Blocks 68 of hard magnetic materials such as Alnico are located between the concentrically disposed sets of laminations which comprise the magnetic circuit for the core. The complete mass of laminations, copper plates and Alnico blocks are held together by bolts 66 extending axially therethrough. An A.C. magnetizing coil 70 is mounted on each of the core legs, around the Alnico, and is connected in series with the rotor winding. An additional D.C. coil 71 may be wound thereover for controlling the degree of saturation of each pole in the core.

The reactor therefore comprises 6 A.C. coils surrounding 6 poles and forming a 3-phase winding with 2 coils per phase which may be connected either in series or parallel. D.C. coils may also be placed on the core legs for control purposes. Preferably, the A.C. coils are arranged in the sequence A, B, C, A, B, C so that there are 120 electrical degrees between successive legs, giving a 2 cycle or 4-pole magnetic flux distribution. As an alternative, the coil sequence could be A, —B, C, —A, B, —C, giving 60 electrical degrees between legs and a 2-pole flux distribution, but this would require a radial yoke depth of about twice the size to provide the same yoke flux density. In either case the phasor sum of the alternating voltages induced in the 6 pole D.C. winding, its alternate north and south poles will be zero, so long as phase balance is maintained.

One of the practical problems associated with the circular type of Saturistor reactor construction resides in providing an arrangement capable of dissipating the losses in the Alnico in order to keep it at a reasonable operating temperature. The impedance curves of FIGURES 2 and 3 show that the 60 cycle power loss may be in the order of 300 watts per cubic inch. A Saturistor reactor of the type illustrated in FIGURES 7, 8 and 9 utilizes aluminum plates which form vanes for dissipating the heat. The plates form thin radial air ducts where they pass through the laminations, thus providing an avenue for the flow of cooling air which washes the heat from the exposed plate and lamination surfaces. By using ⅜" thick and 1.5" deep Alnico blocks, and ½" projections for the aluminum vanes, about 2 square inches of aluminum and 20 square inches of steel laminations of exposed surface are provided, including the duct surfaces, per cubic inch of Alnico. An average heat dissipation of 5 watts per square inch at full speed will allow an average loss of about 100 watts per cubic inch in the Alnico, which corresponds to full current at a slip of 0.3 or ⅓ of full frequency. If all the loss of 300 watts per cubic inch were dissipated in the Alnico, its temperature would rise about 6° per second, or about the same as for copper at a current density of 20,000 amperes per square inch. If the volume of the outer ring of laminations, which is in intimate contact with the aluminum plates is included, the rise comes down to about 2° C. per second. There therefore is adequate heat capacity to smooth out peaks in a duty cycle, and a shaft mounted Saturistor has sufficient heat dissipating ability for many duty cycle requirements now handled by wound rotor motors with external resistors.

To illustrate the effectiveness of this combination of a motor and Saturistor reactor, a 5 H.P., 4-pole, 3-phase, 208 volt motor was tested using two different circular Saturistor reactors of the type disclosed in FIGURES 7, 8 and 9. FIGURE 10 shows the speed-torque-current curves for the motor which clearly indicate the use of a Saturistor reactor in the secondary circuit of a wound rotor motor imparts to the motor a remarkably constant torque and current over the speed range from rest up to the torque breakdown point.

Curves A in the figure show the test performance using Alnico VIII and 44 turns per coil in the reactor, while curves B are for Alnico V with 40 turns per coil. Curves C show the calculated torque and current for the same motor with a fixed reactance and resistance in series with the rotor, selected to give the same full load slip, with values of breakdown torque and current intermediate A and B. The Alnico VIII has a higher coercive force than the Alnico V, so that its impedance "picks up" at a higher current, and the resulting speed-torque-curve is more nearly square than that for Alnico V. Each of these Saturistor reactors contained 13½ cubic inches of Alnico or 2.7 cubic inches per horsepower. It will be apparent to those skilled in the art that a wide range of performance characteristics can be obtained by using either more or less Alnico and adjusting the reactor turns and dimensions.

Since the eddy current losses in the laminations add to the effective resistance at high values of slip and tend to increase the pick-up current, and therefore reduce the saturation at higher current values, the laminations in this design of Saturistor reactor could be made quite thick, preferably about .062" or greater. Conventional laminations having a thickness of .044" were used in the motors tested.

The curves show that the performance for the 5 H.P. motor described above is much superior to that obtainable without the use of contactors to change the resistance. Wound rotor motors having a shaft mounted Saturistor with no slip rings, brushes, or external control of any kind are therefore particularly useful for pump, fan, generator and other drives where stepless low current starting is desired, with high breakdown torque and low starting current. This design of motor may find important use in A.C. hoist applications having voltage control on the primary or stator winding and including a scheme of feedback speed control and reversing without contactors. Heretofore, wound rotor motors with external fixed resistors and parallel connected closed core reactors have been used for this purpose, but these have less torque per ampere at locked rotor, a lower full load speed for a given breakdown torque, and a lower operating power factor.

To obtain speed or torque control, a D.C. winding is added to each pole, as shown, and these are connected alternately, positive and negative, to form a 6-pole magnetic field that is non-inductive with the 4-pole A.C. field of the rotor currents with the result that no net A.C. voltage is induced in the coil winding. When the A.C. coils are excited with balanced 3-phase currents, the A.C. flux induces voltages 120° apart in successive D.C. coils, and this adds to zero around the circuit. To reduce the insulation requirements of the D.C. winding, each D.C. coil may be wound in two or more duplicate sections connecting like sections on successive poles in series, thus making the entire circuit two or more times to complete the D.C. winding. By doing this, a saturable reactor is formed with A.C. and D.C. coils on the same legs, thus requiring only about half as much steel as the usual saturable reactor which has a center leg of twice that width to carry the D.C. coils, with two outer legs carrying the A.C. coils. This construction can be used equally well for a Saturistor reactor or a conventional reactor, the only difference being, one uses Alnico while the other uses steel in the core legs. The principal design requirement is that all the M.M.F. applied to the magnetic circuit to be used by the legs, and none by the outer and inner yokes, because otherwise the voltages induced in successive coils become unsymmetrical and A.C. voltages would appear across the D.C. terminals.

By connecting the control winding of the Saturistor across a feedback circuit that gives a signal proportional to the difference between the motor speed or torque and a desired value, the motor performance can be controlled. It may be advisable to connect a resistor, or other form of impedance, in parallel with the Saturistor, to improve the power factor at both ends of the speed range. An especially effective means of control is to provide a small permanent magnet exciter on the motor shaft, which supplies the D.C. control winding of the Saturistor through rectifiers. Then, at locked rotor, the Saturistor impedance has its full value, but it is reduced steadily as the speed rises, as a result of the control current increasing in proportion to the speed.

In the design having a Saturistor reactor mounted on the rotor shaft it becomes possible to use a two to one speed stator winding with a single rotor winding to obtain twice as great a speed range. There are several different ways of connecting the Saturistor for two speed operation. Referring to FIGURES 11*a* and *b*, the rotor winding 72 was connected with two parallel circuits connected in Y with A.C. coil 74 of the Saturistor connected in series with each circuit, and the three rotor winding terminals connected to three slip rings 76. When the high speed stator connection is made, the rotor currents flow up the one circuit and down the other as shown by the arrows in FIGURE 11*a* so that the phases are independent and the slip rings are made idle. The A.C. coil 74 of the Saturistor may be connected to either add or subtract their M.M.F.'s, so that the Saturistor impedance may be substantially zero, or it may be the full amount, depending on the desired performance.

When the low speed stator connection is used, the rotor currents of each circuit flow in parallel to the slip rings and then through an external resistance 75 as shown in FIGURE 11*b*. Again, the Saturistor coil 74 may be connected to either add or subtract their M.M.F.'s.

A number of different circuit arrangements are therefore feasible thus imparting great flexibility in the application of two-speed wound rotor motors. Heretofore, if a two speed wound rotor motor were used, 6 slip rings normally were required to permit varying the external resistance at each speed. With the new arrangement described above, the shaft mounted Saturistor provides the needed external resistance on one or even on both speeds but additional impedance can be added on one speed through the slip rings. This scheme may find particular use in wide speed range applications where it is necessary to provide high torque for starting, but lower torque at high speed, as for constant horsepower drives, such as diesel powered locomotives. In such cases, the Saturistor may be relied upon for the needed external impedance in high speed operation, and during switching from one speed to the other, while external slip ring impedances will perform the severe duty during low speed and starting conditions.

The above discussion has been directed towards a wound rotor induction motor wherein the Saturistor reactor is located either remote from the motor or mounted on the rotor shaft and then coupled to the winding by appropriately arranged conductors.

Since the conductor bars usually are cast into a squirrel cage rotor during the manufacturing process, and the winding is not connected electrically to an outside source the hard magnetic material must be incorporated in the slots or end rings if it is to be associated with this kind of machine. The Alnico bars are preferably inserted in the outer portions of the rotor slots and the aluminum winding is then cast into the lower portions of the slots, at the same time holding the Alnico in position. The bar currents which flow through the winding when the stator winding is energized thus produce slot leakage flux through the Alnico in a peripheral direction.

The Alnico bars must be accurately positioned in the squirrel cage rotor to provide for optimum transfer of heat, for establishing the desired value of pick-up current and for obtaining the desired degree of deep bar effect. In view of the latitude of design made possible by the existence of the squirrel cage slot many different slot constructions can be designed for obtaining a particular standard of performance for the motor.

Referring to FIGURE 12 it will be seen the squirrel cage rotor 79 is of conventional design and includes a multiplicity of stacked laminations 80 having a winding 81 provided in slots therein which terminate in conventional short circuiting end rings 82.

Figure 13:
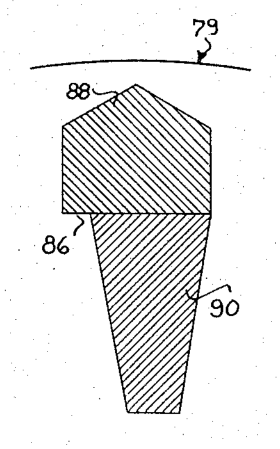

The simplest design of squirrel cage slot 84 for accepting the Alnico and aluminum conductors is illustrated in FIGURE 13 which includes an offset portion 86 adjacent the rotor peripheral surface. The Alnico bar 88 fills the entire slot width except for needed tolerances. After the bar has been placed in position, the winding is cast and forms the aluminum conductor 90 which fills the remaining portion of the slot inwardly of the Alnico bars.

All the Alnico bars are placed in the slots in the manner described above and the cast winding is formed according to the usual and conventional practices.

Figure 14:
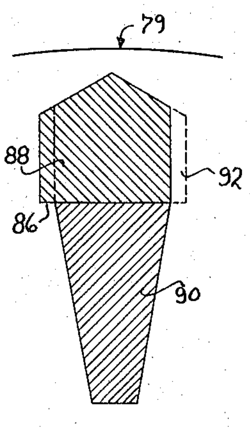

Since the Alnico bars are loosely positioned in the slots before casting the squirrel cage winding, it is necessary to prevent them from becoming displaced axially and circumferentially in handling the rotor before casting or from being driven out of the slots by the force of the incoming flow of molten aluminum. A convenient method for preventing such displacement is to flop over the last punchings on each end of the rotor. As shown in FIGURE 14, the openings formed near the surface of each lamination are displaced to a slight extent so that the opening 92 is offset from the axially extending openings forming the conductor slots. Endwise motion of the Alnico therefore is blocked at each end by a part of the metal forming the lamination. It is obvious that this would be carried out in practice by laying down the first lamination in a reverse position and after the entire stack is built up, the Alinco bars are inserted in the slots and finally the last end lamination is added also in the reverse postiion. The Alnico bars then are shorter than the stacked length by the thickness of two laminations.

An important reason for firmly anchoring the Alnico bar in the slot is that the bar is subjected to large magnetic and mechanical vibratory forces of varying frequency and they therefore move or "shiver" unless rigidly confined in the slot. Should even slight movement take place, the bars will abrade and ultimately break into a multiplicity of small pieces. For this reason, they are best suited for use in motors with squirrel cages having the aluminum cast around the Alnico.

Figure 15:
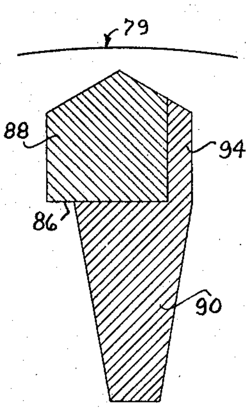
Figure 16:
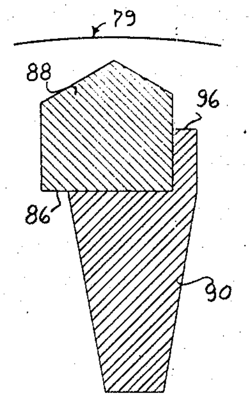

The next simplest plan for positioning the Alnico bar in a squirrel cage slot shown in FIGURE 15, is to design the conductor slot wider at the top than the Alinco bar width. The aluminum is then cast into the resulting leakage gap 94 as an extension of the conductor bar and the Alnico bar 88. The Alnico bar can be fitted widthwise in the slot, as shown in FIGURE 16, by providing an offset 96 in the outer portion of the slot for positioning the bar in a circumferential direction, while the offset shoulder 86 serves to position the bar in a radial direction. Alternatively, an axial wire of small cross section can be inserted the full length of the slot to have it perform the same function as the narrow top portion of the slot shown in FIGURE 16. In those cases where the squirrel cage rotor is equipped with radial air ducts, the tube which carries the molten aluminum across the duct space can be shaped to constrain the Alnico bar widthwise over a small radial distance.

Still another construction is that illustrated in FIGURES 17*a* and 17*b* wherein a rippled thin steel strip 89 is inserted axially in the slot or lengthwise in the leakage gap space. The width of the ripples is chosen to be somewhat greater than the intended leakage gap width to permit the strip to exert a circumferentially directed pressure against the Alnico bars when they are placed in the slots. With the bars inserted, the strip flattens out to a slight extent, thus performing the function of a flat spring for holding the bar firmly in position. When the winding is cast, the ripples of the strip will effectively block aluminum flow past the strip in the axial direction but since the metal fills the bottom portion of slot 90, and is in a molten state, it will flow outwardly into the spaces 98 formed between the surfaces of the rippled strip and the Alnico bar and conductor slot walls. By utilizing this kind of construction, excellent heat transfer between the Alnico and the slot walls and aluminum conductors is obtained and yet the current path is confined to the aluminum conductor below the Alnico for giving maximum reactance. This arrangement has the further advantage that the tolerance of the slot width and of the Alnico bar width can both be very liberal and yet the desired width of effective leakage gap can be exactly obtained by selecting the proper thickness of the steel strip which preferably should be in the neighborhood of about 15 to 40 mils. Also, different performances can be secured with a given lamination design and a given size of Alnico bar by merely using a different strip thickness.

Still another construction, used when a large deep bar effect is desired in addition to the Alnico torque, consists in inserting idle steel, copper, aluminum or Curie metal filler strips 100 in the leakage slot space shown in FIGURE 18. These strips may extend the full depth of the slot if desired or only a portion thereof depending on the performance desired from a particular motor. If steel strips are used, the teeth of the rotor laminations can be made narrower than normal, relying on the idle steel strips to carry a part of the radial magnetic flux. By such combinations of Alnico and idle bars, the cast aluminum conductors, a great variety of performance characteristics can be obtained using only a few slot dies and a few standard sizes of Alnico bars and varying the inexpensive strips. Four distinct advantages are made possible by this construction.

First, if the strips are made of Curie metal, their permeability will be high when they are cold, and low when the temperature rises above a definite value. Thus when the motor starts cold, the current will be low, but if high torque is needed, it will become available as soon as the motor has heated up. Second, if the strips are steel, relatively thick and perforated radially at intervals, they will constrain the aluminum bars from expanding axially when heated, thus minimizing the possibility of small gaps opening up between adjacent laminations when the conductors expand axially. At a temperature of about 200° C., expansion of the aluminum is sufficiently greater than steel to overcome the initial tension remaining in the aluminum conductors when they cool after casting. When such a gap develops, subsequent cooling of the rotor will not close the gap completely, because of the ratchet effect, and the rotor becomes mechanically unbalanced. The gap also lowers the critical speed and increases the amount of shaft bending on each revolution. Third, thus the use of thick and deep idle steel strips, either with or without the additional use of Alnico bars will give the rotor with cast aluminum winding, increased ability to withstand high temperatures without failing;

and fourth, the strips will also increase the rotor stiffness, even at low temperatures, permitting higher motor speeds or greater stack length to be used than permissible with normal cast aluminum rotor designs.

The construction illustrated in FIGURE 19 represents an arrangement for locating the hard magnetic material adjacent the end rings of a squirrel cage rotor. As in conventional designs, an end ring 102 which constitutes an extension of the winding in the slots is located on each end of the rotor. The hard magnetic material 104 is positioned inwardly at the end rings and is held in position by a steel cylindrical member 106 which is shrunk onto the end ring or otherwise attached thereto. By utilizing this kind of construction, the flux attributable to currents flowing in the end rings will all link the hard magnetic material to provide a substantial reduction in the starting currents over conventional squirrel cage rotors.

It will be apparent that many different designs may be resorted to for holding the hard magnetic material onto the end of the rotor, as by utilizing bolts which extend axially through the cylindrical member and are anchored in the end of the rotor. Alternatively, the cylindrical member may be supported from the shaft. It will be apparent that in lieu of employing a single ring of hard magnetic material, it may be provided in sections wherein each section would comprise either a single or multiplicity of hard magnetic material blocks which could be of a number of different configurations. The precise position of the hard magnetic material relative to the end rings is not important, but rather the material must be positioned so that the flux produced by currents flowing in the end rings link the magnetic material to obtain a high reactance and resistance at starting for reducing the starting currents of the conventional squirrel cage rotors and in providing a high torque per ampere during starting.

The use of Alnico bars in squirrel cage motors permits a reduction in the starting current over present designs, which in turn, allows the making of new stator designs having windings with fewer turns to obtain higher air gap flux densities, with the consequent result that either less copper or a lower copper loss with the same output is obtained, or allowing higher output to be obtained with given overall dimensions. In addition to the examples discussed above, the use of Alnico bars in the rotor slots of reluctance motors, which require very high air gap flux densities to obtain adequate synchronous output, will permit reduced starting current with still sufficient torque at full speed to bring the rotor into synchronism. With the Alnico bars, the starting current of present designs can be about halved with satisfactory pull-in torque, thus allowing new designs to be made with higher flux and simpler laminations that give ample synchronous torque at much lower starting currents.

Flatter speed torque curves are now made possible especially for large motors, thus minimizing the acceleration and transient torque on couplings and shafts. An example of this is a motor for a conveyor drive previously mentioned which utilizes contactors for changing the rotor resistance and which results in abrupt jolts to the material carrying belt. The Alnico bar squirrel cage rotor performs the service of uniform acceleration at lower costs and with more reliable performance than that obtained from the wound rotor motors used in the past.

The use of Alnico bars permits obtaining flat torque curves and low starting current thereby enabling squirrel cage motors to be used throughout wide range speed control service such as for fan or pump or process drives with primary voltage control. This is particularly important because the advent of silicon controlled rectifiers has made available a convenient and low cost method of varying the motor voltage. The conventional squirrel cage motor either has such high resistance that it has too low a full load speed and therefore low efficiency, or it has too high current at reduced speeds. Typically, a one horsepower three phase standard squirrel cage motor requires more than 160% of rated current to drive a fan at ⅔ speed at the needed voltage, whereas the Alnico bar rotor with the same full load speed may require only about 115% current at ⅔ speed, giving only about ½ as much stator copper loss, and therefore half the stator temperature rise.

It is often desirable to provide the variable voltage or variable frequency for motor speed control from solid state devices, but these produce harmonic voltages of considerable magnitude, in addition to the desired fundamental frequency voltage. When an ordinary squirrel cage motor is used, these harmonic voltages produce harmonic currents in the motor, creating losses and reducing the torque. When a rotor having a hard magnetic material in the secondary is used, the higher motor reactance reduces the harmonic currents materially, enabling the motor to furnish the desired torque with less current and less heating. In the case of a one horsepower capacitor motor with which comparative tests were made, with silicon controlled rectifier voltage control by adjusting the firing angle the Saturistor motor drew nearly the same current of 5 amperes at full load and full speed as the standard rotor, but required only about 6 amperes with 80° phase delay to drive a fan at ⅔ speed (4/9 of rated torque) whereas the standard rotor required 10 amperes with 100° phase delay.

Good braking torque with direct current in the stator may be desired for fast stopping of high speed industrial or process drives. The standard squirrel cage rotor has a very peaked braking torque curve (with a fixed value of D.C. in the stator) because the torque is a maximum at about 5 to 10% of synchronous speed, and at higher speeds falls off in proportion to 1/speed. With an Alnico bar rotor, the braking torque remains relatively constant as the speed rises. Thus, the Alnico rotor gives far more effective braking over the speed range.

It is customary to skew the rotor slots of nearly all squirrel cage motors in horsepower ratings below about 25, to reduce the locking and crawling torques, and the induced rotor currents due to the slot and phase belt harmonics of the air gap flux. Skewing introduces extra reactance and sometimes increases the stray losses, which in turn require that some form of rotor slot insulation be used, to prevent currents from flowing from bar to bar in the center of the rotor stack. Since these difficulties all vary as a power of the starting current, skewing can be omitted on most motors with Alnico bar rotors. This is desirable also because the Alnico is brittle, and bar breakage and other difficulties may be expected if these rotors were skewed through a considerable angle. If skewing is necessary the Alnico can be made in short pieces, that can assume their positions in the slot independently.

The distinctive feature of the new concepts disclosed herein is that the Alnico preferably should be used only in the rotor flux leakage paths, and not in the path of the main flux. In this way, the normal magnetizing current, the normal low-resistance rotor winding, and the normal high-torque capacity of industrial motors are retained without any impairment. Also, since the brittle material is confined and held in the rotor slots with the cast aluminum, or is situated in external stationary devices, all the mechanical problems of using the material are greatly simplified or eliminated. Likewise, the hard magnetic material is always used in such ways that the magnetic flux is confined to the preferred direction of magnetization, thus making full use of the material.

In view of the above, it will be apparent that many modifications and variations are possible in light of the above teachings. It therefore is to be understood that within the scope of the appended claims the invention may be practiced other than as specifically described.

What I claim as new and desire to secure by Letters Patent of the United States is:

1. A reactor comprising:
a pair of concentrically disposed laminated magnetic cores spaced from each other,
a central bore formed in the inner of said cores for receiving a motor shaft,
a plurality of blocks of hard magnetic material having more than one million gauss-oersteds stored magnetic energy when fully magnetized, circumferentially spaced from each other and respectively bridging the space between the concentrically disposed cores,
an excitation coil mounted on each of said blocks adapted for energization by an alternating current, and
means securing said cores and blocks of hard magnetic material into a compact mass.

2. A reactor comprising:
a pair of concentrically disposed laminated magnetic cores spaced from each other a predetermined distance,
the inner of said cores having a central bore and a multiplicity of flat sides on its outer surface complementary to similarly formed surfaces on the inner face of the outer core,
blocks of hard magnetic material having more than one million gauss-oersteds stored magnetized energy when fully magnetized, circumferentially spaced from each other and respectively positioned in the space provided by the complementary surfaces of the inner and outer cores and bridging the gap therebetween,
support means holding said inner and outer cores and the blocks of hard magnetic material in a compact mass, and
coils wound on the magnetic core for effecting magnetization of said blocks of hard magnetic material by an alternating current.

3. A reactor comprising:
a pair of concentrically disposed but spaced laminated magnetic cores,
the outer surface of the inner core and the inner surface of the outer core each having surfaces complementary to each other,
a pluality of metallic strips for heat dissipation respectively disposed between and separating groups of the laminations comprising the inner and outer cores,
said strips being in axial alignment but spaced angularly from each other around said cores,
blocks of hard magnetic material having more than one million gauss-oersteds stored magnetic energy when fully magnetized, positioned in the spaces formed by the adjacent metallic strips and forming legs for the reactor, and
a coil wound around each of said legs of hard magnetic material so that when energized by an alternating current voltage, a plurality of magnetic poles are established corresponding to the number of legs resident in the magnetic cores.

4. The combination according to claim 3 wherein said metallic strips extend radially outward from the outer magnetic core for conducting heat from the cores outwardly for dissipation to an external medium.

5. A secondary member for an induction motor comprising:
a magnetic core having conductor receiving slots therein,
a winding in said slots,
a hard magnetic material having more than one million gauss-oersteds of stored magnetic energy when fully magnetized disposed in said slots in leakage flux paths of the magnetic flux produced by the currents that flow in said winding,
the resulting circuit having an impedance whose resistance as well as its reactive components vary in proportion to the secondary slip frequency (1—the per unit speed).

6. A squirrel cage rotor comprising:
a plurality of stacked laminations having axially extending slots therein,
conductors in said slots terminating in end rings disposed on opposite ends of the magnetic core, and
a hard magnetic material having more than one million gauss-oersteds stored magnetized energy when fully magnetized in each of said slots,
said material creating a current limiting impedance having a resistive component that varies in proportion to the frequency for providing high torque per ampere during the starting period.

7. A squirrel cage rotor comprising:
a multitude of stacked laminations forming a magnetic core and having a plurality of axially extending slots therein,
a hard magnetic material having more than one million gauss-oersteds stored magnetized energy when fully magnetized positioned in the flux leakage paths in said slots, and
a cast squirrel cage winding in said slots terminating in end rings disposed on opposite ends of a magnetic core.

8. A squirrel cage motor secondary member comprising:
a plurality of stacked laminations foming a magnetic core and having axially extending slots therein,
each of said slots including a shoulder formed on one of the slot walls,
a bar of hard magnetic material having more than one million gauss-oersteds stored magnetic energy when fully magnetized and having surfaces complementary to that portion of the slot including said shoulder positioned in each of said slots, and
conductors in each of said slots in contact with said hard magnetic material for holding it immovably in position and terminating at their opposite ends in end rings disposed on the opposite ends of the magnetic core.

9. The combination according to claim 8 wherein one or more of the laminations respectively positioned on opposite ends of the core are turned over with respect to the other laminations forming the core for thereby holding said hard magnetic material in position prior to and during casting said conductors in the magnetic core slots.

10. A squirrel cage member comprising:
a plurality of stacked laminations forming a magnetic core and having conductor receiving slots therein,
each of said slots including at least a pair of peripherally extending shoulders formed therein,
a bar of hard magnetic material having more than one million gauss-oersteds stored magnetic energy when fully magnetized and having a configuration compatible with said shoulders and positioned in each of said slots,
each of said bars occupying a space less than the circumferential width of said slots and less than the radial length of said slots, and
conductors filling the remaining space in each of said slots and terminating at their opposite ends in end rings disposed on opposite sides of the magnetic core.

11. The combination according to claim 10 wherein the bars of hard magnetic material are located closer to the peripheral surface of the magnetic core than the conductors in the remaining portions of said slots.

12. The combination according to claim 10 wherein the bars of hard magnetic material are offset circumferentially from the main portion of the conductor slots.

13. A squirrel cage rotor comprising:
a plurality of stacked laminations forming a magnetic core and having a plurality of conductor receiving slots therein, a bar of hard magnetic material having more than one million gauss-oersteds stored magnetic energy when fully magnetized and positioned in the outer portions of each of said slots, a metallic strip of material positioned between a side of the bars of hard magnetic material and the slot walls for holding the former immovably in position, and a conductor cast in each of said slots and in intimate contact with said strip of hard magnetic material and terminating in end rings disposed on opposite ends of the magnetic core.

14. The combination according to claim 13 wherein said strip of material is corrugated and extends substantially the length of the conductor slots.

15. The combination according to claim 13 wherein said strips of material extend substantially the length of said slots and substantially the depth of said slots.

16. A squirrel cage rotor comprising:

a plurality of stacked laminations having conductor receiving slots therein, a bar of hard magnetic material having more than one million gauss-oersteds stored magnetic energy when fully magnetized and positioned in each of said slots, a conductor in each of said slots terminating in end rings disposed on opposite ends of the magnetic core, and metallic means in each of said slots for creating eddy current losses, and for imparting radial stiffness to the rotor.

17. A squirrel cage rotor comprising:

a plurality of stacked laminations forming a magnetic core and having conductor receiving slots therein, a winding in said slots, a bar of hard magnetic material having more than one million gauss-oersteds stored magnetic energy when fully magnetized positioned in each of said slots and associated with the paths of leakage flux produced by rotor currents so that the rotor currents generate hysteresis losses which create a resistive component proportional to frequency in the rotor circuits, thereby providing current limiting and high torque per ampere during starting without the use of contactors.

18. An induction motor comprising:

a wound rotor having two or more parallel connected windings, a stator equipped with a pole changing winding, a reactor comprising a laminated magnetic core having legs of hard magnetic material of more than one million gauss-oersteds stored magnetic energy when fully magnetized, a coil on each of said legs adapted for energization by an alternating current, said coils being connected in series with said rotor windings, said coils and rotor windings being connected in such a way that when the stator winding with one number of poles is energized, currents in each phase of the parallel connected rotor windings flow in the same direction, and when the stator winding is energized with the other number of poles of the currents in the parallel connected rotor windings flow in opposite directions.

19. A wound rotor induction motor comprising:

a laminated magnetic core having a winding therein, a reactor associated with the winding, said reactor comprising:

a laminated magnetic core having legs of hard magnetic material having more than one million gauss-oersteds stored magnetic energy when fully magnetized and completing the magnetic circuit for the reactor, a coil on each of said legs adapted for energization by an alternating current, said coils being connected in series with the winding in said rotor.

20. A wound rotor induction motor comprising:

a laminated magnetic core having a winding therein, a shaft for said core and means mounted on said shaft including a hard magnetic material having more than one million gauss-oersteds stored magnetic energy when fully magnetized, means associated with said material for magnetizing it by an electric current, said material creating a current limiting impedance having a resistive component that varies in proportion to the frequency, and conductors connecting said means in series with the winding.

21. A wound rotor induction motor comprising:

a laminated magnetic core having a winding therein, a shaft supporting said core, a reactor mounted on said shaft, said reactor comprising a pair of concentrically spaced magnetic cores, legs of hard magnetic material having more than one million gauss-oersteds stored magnetic energy when fully magnetized bridging the space between said cores, a coil mounted on each of said legs and connected in series with the winding in the rotor to provide an impedance proportional to the rotor frequency.

22. A wound rotor induction rotor comprising:

a laminated magnetic core having a winding therein, a shaft for said core, a reactor mounted on said shaft, said reactor comprising a pair of circular and concentrically spaced inner and outer magnetic cores each having a plurality of complementary facing flat surfaces, a plurality of sections of hard magnetic material each having more than one million gauss-oersteds stored magnetic energy when fully energized bridging the space between said cores and having their oppositely disposed ends in contact with the flat faces respectively formed on the inner and outer cores, a coil on each of said sections of hard magnetic material connected in series with the winding in the rotor to provide a resistance proportional to the motor slip frequency.

References Cited by the Examiner

UNITED STATES PATENTS

| | | | |
|---|---|---|---|
| 1,031,802 | 7/1912 | McCollum | 310—212 |
| 1,134,776 | 4/1915 | Thomson | 310—212 |
| 1,508,152 | 9/1924 | Alger | 310—212 |
| 1,584,253 | 5/1926 | Tanner | 310—212 |
| 1,823,337 | 9/1931 | Sheely | 310—212 |
| 2,218,711 | 10/1940 | Hubbard | 336—110 |
| 2,381,763 | 8/1945 | McCreary | 336—110 |
| 2,802,170 | 8/1957 | Starr et al. | 336—110 |

MILTON O. HIRSHFIELD, *Primary Examiner.*

L. L. SMITH, *Assistant Examiner.*